Aug. 9, 1938.  M. E. GORDON  2,126,107
VENTILATING SYSTEM AND METHOD OF INSTALLING SAME
Filed April 23, 1937   2 Sheets-Sheet 1
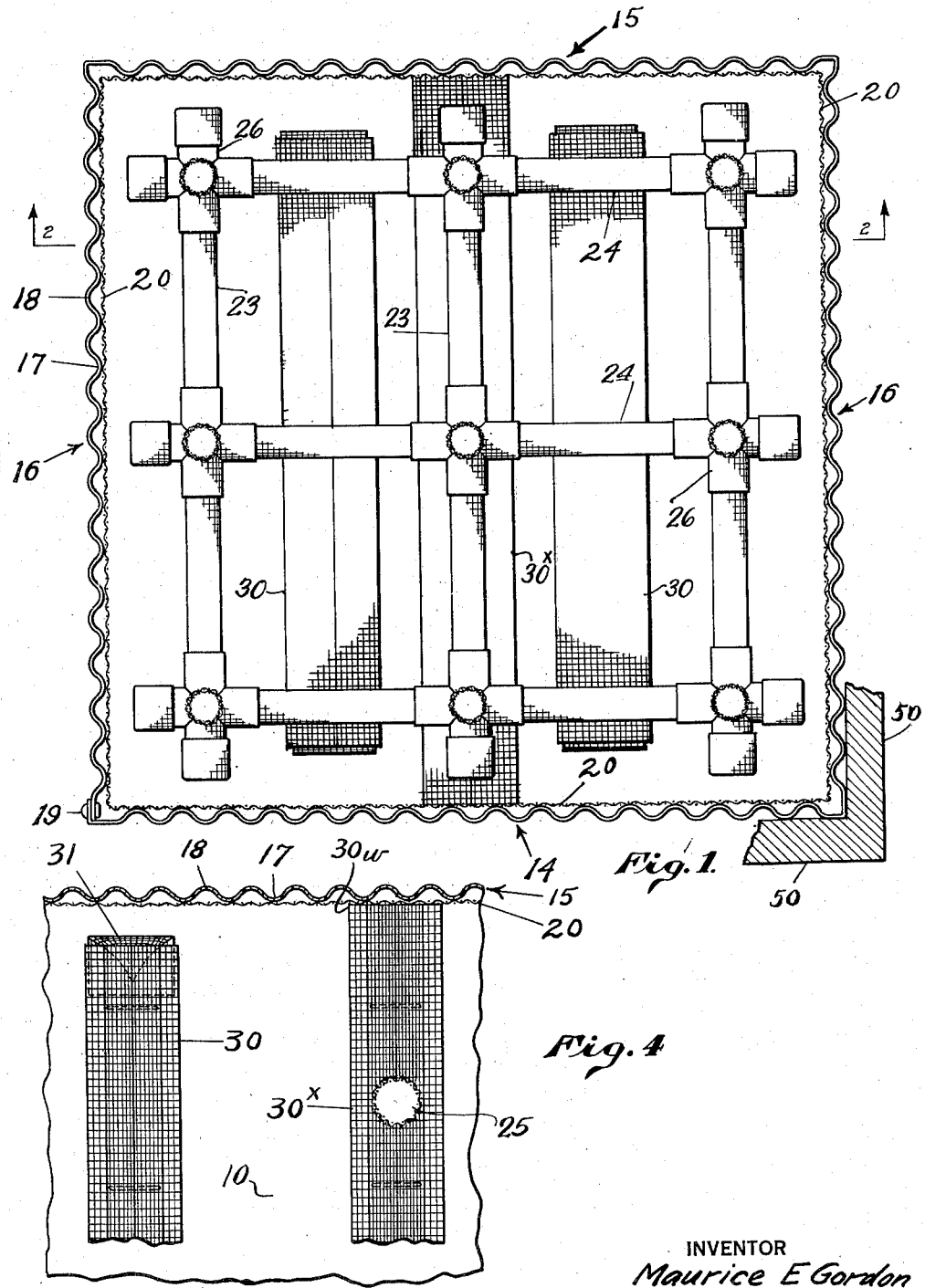
INVENTOR
Maurice E Gordon
BY
Robt. W. Pearson
ATTORNEY Aug. 9, 1938.   M. E. GORDON   2,126,107
VENTILATING SYSTEM AND METHOD OF INSTALLING SAME
Filed April 23, 1937   2 Sheets-Sheet 2
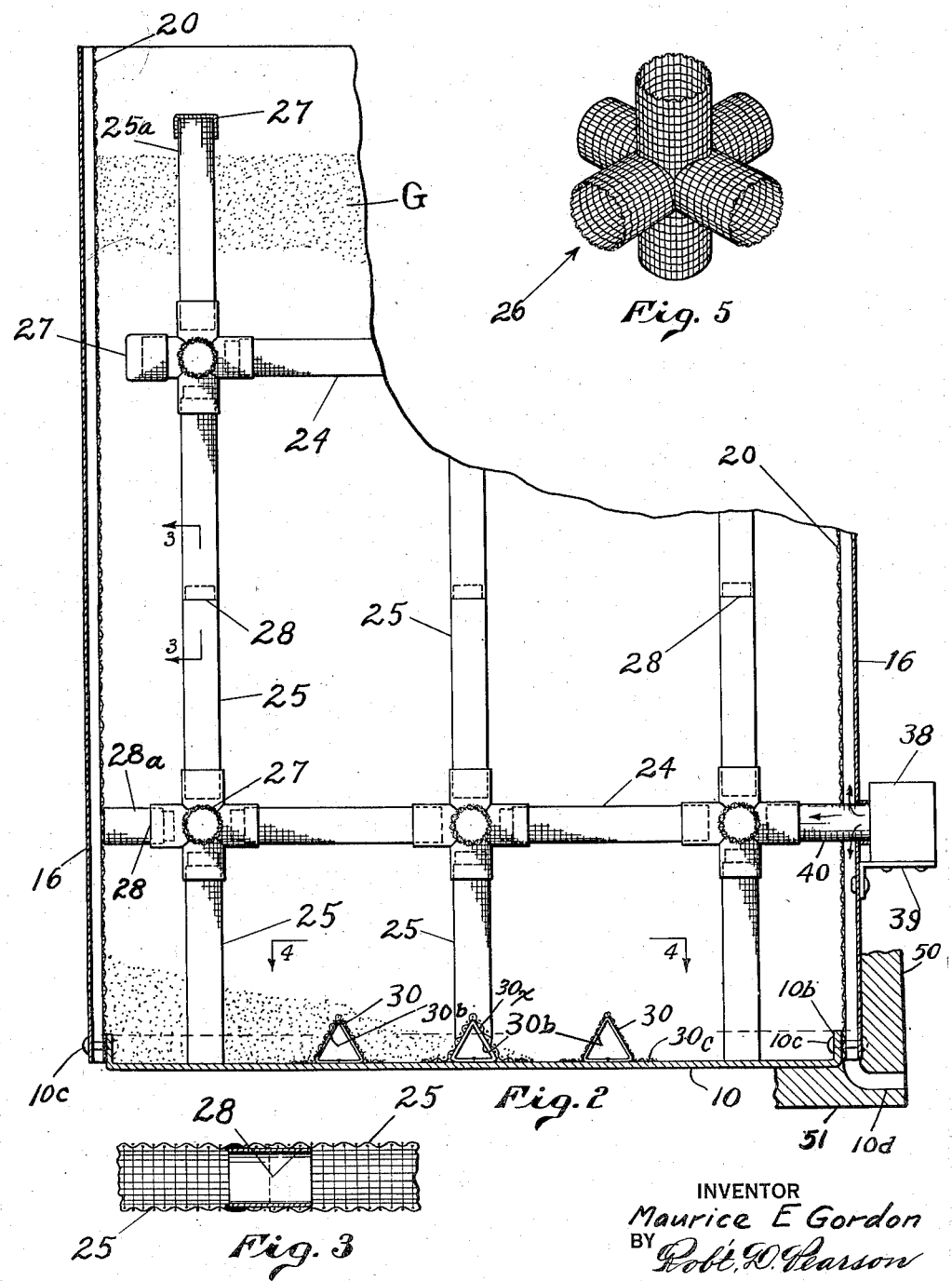
INVENTOR
Maurice E Gordon
BY Robt. D. Pearson
ATTORNEY Patented Aug. 9, 1938

2,126,107

UNITED STATES PATENT OFFICE 2,126,107

VENTILATING SYSTEM AND METHOD OF INSTALLING SAME

Maurice E. Gordon, Los Angeles, Calif.

Application April 23, 1937, Serial No. 138,619

7 Claims. (Cl. 98—55)

This invention relates to a ventilating construction for grain bins and the like, and to the method of installing said construction.

The invention is applicable not only to the ventilation of stored grain but is also useful as a means for ventilating other stored agricultural products and, in fact, for the ventilation of a great variety of stored substances.

Among other important uses of the invention is to provide an efficient means for ventilating stored soy beans. Hitherto it has been found impossible to store soy beans in bins or containers of much size, for the reason that this bean requires an unusual amount of ventilation to preserve it in storage for any considerable length of time.

One object of the invention is to provide a simple, inexpensive and readily installed means for ventilating bodies of stored substances of a character that are in danger of becoming overheated to such an extent as to produce spontaneous combustion. The invention provides an efficient means for the prevention of spontaneous combustion of stored hay or of any like combustible substance.

Another object of the invention is to provide an effective means for curing in an even manner various grains and other substances that require, or necessarily undergo, a "sweating" process while they are in a stored condition.

Other objects, advantages and features of invention may hereinafter appear.

Referring to the accompanying drawings, which illustrate what is at present deemed to be a preferred embodiment of the invention, Fig. 1 is a plan view showing, by way of example, a grain bin embodying the invention.

Fig. 2 is a vertical section taken on line 2—2 of Fig. 1.

Fig. 3 is a vertical sectional detail on line 3—3 of Fig. 2.

Fig. 4 is an enlarged transverse section on line 4—4 of Fig. 2, including a fragment of one of the side walls of the bin.

Fig. 5 is a perspective detail of one of the multi-branched fittings used to connect together adjacent end portions of the ventilating tubes.

Referring in detail to the drawings, the ventilating means provided by this invention include the vertically corrugated plates shown, consisting of a front plate 14 forming the front wall of the bin, the rear plate 15 and the side plates 16, all these plates being vertically corrugated with inwardly directed corrugations 17 alternating with outwardly directed corrugations 18, thus giving them a sinuous internal surface. Said plates may be made in separate pieces for insertion in ready-built bins, but in the drawings are shown in a single piece. A heavy sheet metal plate is shown forming the floor 10, said plate having a marginal flange 10b which is shown secured internally to the upstanding portions of the bin wall by means of rivets, or bolts, 10c.

After the walls of the bin have been formed by means of aforesaid corrugated plates, said plates are lined with an open meshed screen 20 or foraminated metal plates, the foramina, whether of the screen or of the foraminated plates, being large enough to provide ample ventilation but being too small to admit the grain G or particles or granules of whatever other substance is contained in the bin which embodies the invention.

In the lower right hand portion of Fig. 2 an air passage 10d is shown which represents one of a number of ventilating passages which afford a communication between the exterior atmosphere and the air passage beneath the corrugation 18 shown by way of example in this part of the view. The screen lining is clamped between the floor flange 10b and the corrugated wall.

The corrugated wall structure may be in a continuous sheet having its edges joined at one corner of the bin by rivets 19.

In order to ventilate the contents of the bin interiorily as well as adjacent to the walls of the bin, laterally extending foraminated intersecting tubes 23 and 24 are provided and with these communicate the upstanding foraminated tubes 25. The six-branched fitting 26 detailed in Fig. 5, also of screen or foraminated tubing, is used to join aforesaid three sets of tubing in an intercommunicating manner. Caps 27 are applied where necessary to close any branch or branches of a fitting 26 in the assembly which would otherwise be open. In the upper portion of the bin the upstanding air vent foraminated tubular sections 25a are added, the upper ends of which extend above the level of the grain in the bin. 38 designates an air pressure or air inlet supply means located externally of the bin, supported upon a bracket 39 secured to the wall of the bin, and communicating with the tubing assembly through the foraminated tube 40. A forced draft may be supplied by this means, in which case the inlets 10d may be closed in any desired manner.

Upon the floor of the bin are shown sectionally triangular air space tubes 30, having triangular, internally fitting end caps 31 (see Fig. 4), and triangular internal braces 30b. The floor forms the bottom of the tubes 30, the screen having the foot portions 30c. If desired said triangular tubes may be placed in communication with the lower members of the upstanding tubing 25 and with the plate members 14, 15 and 16, as shown at 30x in the lower portion of Fig. 2, and at 30w in Fig. 4. In the particular arrangement illustrated in the drawings, tube 30x is shown in communication with tubing 25 and the two tubes 30 do not communicate either with the upstanding tubing or with said walls, but serve only to provide air spaces adjacent to the floor of the bin.

In Fig. 1 a fragmental portion of wall portion 50 of a ready-built bin is shown to illustrate the combination of the ventilating means with a bin having a bottom floor and walled in sides. In Fig. 2 a floor fragment 51 is shown supporting the side wall portion 50 of the same bin.

The entire assembly, so far as the circular tubing shown is concerned, may be made up of tubes like the tube 25a (see upper right hand portion of Fig. 2) combined with the fittings 26 and caps 27. Between the levels of the two sets of lateral members shown tubular connectors in Fig. 2 are shown interfitted at 28, it being understood that throughout the assembly tubular diameters are such as to make proper unions.

In Fig. 3 is shown one of the inner joint tubes 28 used wherever necessary to unite the foraminated tubular sections.

In the lower left hand portion of Fig. 2 a short, foraminated sleeve 28a is shown which abuts against the screen at that side of the bin to give added air circulation. Said sleeve is attached by one of the couplers 28.

The method of installing the system may be briefly summarized as follows:

The triangular floor tubes 30 are first laid upon the floor of the bin in a properly spaced relation to each other and have applied to them their end caps 31. After this has been done the sections of the laterals 23 and 24 of the lowest series shown in Fig. 1 are joined to each other by using the required number of fittings 26. Next, the lower arms of said fittings have inserted into them the lower set of uprights 25. Then caps (like the cap 27 near the top of Fig. 2) are applied to the upwardly directed arm of the fittings which have been put in place as just stated, and other of the caps 27 are applied to any uncovered fitting arms. Grain, or the like, may now be thrown into the bin without entering the portion of the tubular ventilating system installed as aforesaid.

After a sufficient amount of the grain or other material has been filled into the bin to come up to about the level occupied by the lower set of laterals thus far installed, the caps on the upwardly directed arms of the fittings are removed and in their places the upstanding tubes of the next higher series are inserted. These, in turn, may have their upper ends capped preparatory to filling in more grain, or more laterals may be applied and furnished with capped fittings in the manner already described.

I claim:

1. In a ventilating construction, a container having upstanding side walls, lining members of stiff sheet material interiorly overlying said walls, said lining members having corrugations positioned to form a sinuous wall, and foraminated members interiorly overlying said corrugated members to prevent the contents of the container from entering said corrugations.

2. The subject matter of claim 1 and, said corrugations extending upwardly and downwardly.

3. In a ventilating construction, a container having upstanding side walls, lining members of stiff sheet material interiorly overlying said walls, said lining members having juxtaposed corrugations which give them a sinuous form, screening interiorly overlying said corrugated members to prevent the contents of the container from entering said corrugations, and foraminated tubular ventilating means within the container in spaced relation to its walls and communicating with the wall spaces afforded by the combination of said corrugated members with said screening.

4. In a ventilating system for bins and the like, a ventilating member adapted to rest on the floor of the bin underneath the contents thereof, said member consisting of a reinforced strip of stiff screen bent along its mid-width and disposed upon the floor of the bin with its bent portion directed upwardly, said screen being transversely continuous with its foot portions resting flatwise upon the floor.

5. The subject matter of claim 4 and, the reinforcement for said screen consisting of a rod extending interiorly therearound.

6. In a ventilating construction, a container having upstanding side wall members having continuous corrugations thus providing a sinuous surface, and foraminated members interiorly overlying said surface to prevent the contents of the container from entering said corrugations.

7. The subject matter of claim 6 and, said corrugations extending upwardly and downwardly.

MAURICE E. GORDON.